US008843110B2

(12) United States Patent
Laghrari et al.

(10) Patent No.: US 8,843,110 B2
(45) Date of Patent: Sep. 23, 2014

(54) METHOD OF PROVIDING DATA-RELATED SERVICES TO A TELEMATICS-EQUIPPED VEHICLE

(75) Inventors: Fahd Z. Laghrari, Commerce Township, MI (US); Kevin R. Krause, Plymouth, MI (US); Robert J. Myers, Van Buren Township, MI (US)

(73) Assignee: General Motors LLC, Detroit, MI (US)

( * ) Notice: Subject to any disclaimer, the term of this patent is extended or adjusted under 35 U.S.C. 154(b) by 2134 days.

(21) Appl. No.: 11/773,048

(22) Filed: Jul. 3, 2007

(65) Prior Publication Data

US 2009/0012675 A1 Jan. 8, 2009

(51) Int. Cl.
*H04M 1/66* (2006.01)
*G07C 5/00* (2006.01)

(52) U.S. Cl.
CPC .................................... *G07C 5/008* (2013.01)
USPC ............................ 455/411; 455/403; 701/484

(58) Field of Classification Search
USPC .............. 455/456.1, 403, 410, 411, 418, 419, 455/420; 701/1, 29, 33, 29.1–29.9, 701/33.1–33.9, 451, 453, 484, 515
See application file for complete search history.

(56) References Cited

U.S. PATENT DOCUMENTS 6,959,173 B2 10/2005 Kawai
2001/0049569 A1* 12/2001 Gehrke ............................ 701/1
2003/0103482 A1 6/2003 Van Bosch
2003/0207682 A1* 11/2003 Videtich ....................... 455/410
2004/0044454 A1* 3/2004 Ross et al. ...................... 701/33
2004/0152446 A1 8/2004 Saunders et al.
2004/0203672 A1* 10/2004 Crocker et al. ............... 455/415
2005/0107035 A1* 5/2005 Zoeckler ...................... 455/12.1
2005/0137763 A1* 6/2005 Watkins et al. ................. 701/33
2005/0187682 A1* 8/2005 Gault et al. ..................... 701/33
2005/0256614 A1* 11/2005 Habermas ......................... 701/1
2005/0273505 A1 12/2005 Kim
2005/0283388 A1 12/2005 Eberwine et al.
2006/0046649 A1* 3/2006 Videtich ...................... 455/12.1
2006/0111140 A1* 5/2006 Wang et al. ................ 455/552.1
2007/0054677 A1* 3/2007 Himmelstein ............. 455/456.2
2008/0102854 A1* 5/2008 Yi et al. ..................... 455/456.1

OTHER PUBLICATIONS

German Office Action for German Patent Application No. 10 2008 030 974.5, corresponding to U.S. Appl. No. 11/773,048, Oct. 8, 2009, 5 pages.

* cited by examiner

*Primary Examiner* — Stephen Holwerda
(74) *Attorney, Agent, or Firm* — Anthony Luke Simon; Reising Ethington P.C.

(57) ABSTRACT

A communications method that gathers status information on a telematics-equipped vehicle before establishing a mobile-terminated data connection with that vehicle. In general, the communications method sends a status request message to a wireless carrier system that asks for certain status information on a particular telematics-equipped vehicle. After the wireless carrier system gathers the status information, it sends back a status response message. If the status response message indicates that the telematics-equipped vehicle is able to receive certain data-related services, then a mobile-terminated data connection is established and the services are provided. If the telematics-equipped vehicle is unable to receive the data-related services, then attempts are made to identify and resolve the problem. In cases where the telematics-equipped vehicle is not registered with a wireless network, a monitor request message is sent to the wireless carrier system which puts it on the lookout for registration of the vehicle in question.

19 Claims, 2 Drawing Sheets

METHOD OF PROVIDING DATA-RELATED SERVICES TO A TELEMATICS-EQUIPPED VEHICLE

TECHNICAL FIELD

The present invention generally relates to methods for communicating data and, more particularly, to communications methods that utilize status information regarding wireless communication devices before establishing mobile-terminated data connections with those devices.

BACKGROUND

Numerous types of wireless communication devices are used throughout the world each day, including devices such as cellular phones, pagers, personal digital assistants (PDAs), and vehicle communication devices. Many of these devices use one or more types of communication channels, including voice and data channels, to provide a variety of services over wireless networks. Some devices utilize data encoding techniques to communicate both voice and data information over a voice channel, while other devices must use a data channel to send data information. In certain instances, the use of a dedicated data channel to send and receive data information can result in enhanced data services such as additional bandwidth, error detection, and inter-operability with other devices.

The operational status of wireless communication devices is oftentimes changing. For example, when a wireless communication device is turned on, it typically registers with the local wireless carrier system whose boundaries it is located within. Similarly, in order for a wireless communications device to engage in voice and/or data communications, it must be authenticated by the wireless carrier system that it wishes to use. The registration and authentication status of the wireless communications device are but two possible pieces of status information that can affect the overall operational status of the device, as other types of status information can also impact the operational status. In some situations, such as when making a mobile-terminated data connection, it can be helpful for a contacting entity to know the operational status of the wireless communications device that it is trying to contact.

SUMMARY OF THE INVENTION

According to one aspect of the invention, there is provided a method of providing data-related services to a telematics-equipped vehicle. The method comprises the steps of: (a) sending a status request message to a wireless carrier system, (b) receiving a status response message from the wireless carrier system, (c) utilizing status information to determine if the telematics-equipped vehicle is able to receive the data-related services; and (d) if the telematics-equipped vehicle is able to receive the data-related services, then providing the data-related services to the telematics-equipped vehicle by establishing a mobile-terminated data connection with the telematics-equipped vehicle.

According to another aspect of the invention, there is provided a method of providing data-related services to a telematics-equipped vehicle. The method comprises the steps of: (a) sending a status request message from a call center to a wireless carrier system, (b) receiving a status response message from the wireless carrier system at the call center, and (c) utilizing the status information to determine if the telematics-equipped vehicle is registered with a wireless network so that: (i) if the telematics-equipped vehicle is registered and is able to receive the data-related services, then providing the data-related services; (ii) if the telematics-equipped vehicle is registered but is unable to receive the data-related services, then reviewing the status information to determine the cause of the problem; and (iii) if the telematics-equipped vehicle is not registered, then sending a monitor request message from the call center to the wireless carrier network.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The communications method described below gathers status information on a telematics-equipped vehicle before establishing a mobile-terminated data connection with that vehicle. This enables the communications method to provide data-related services to the telematics-equipped vehicle in a more efficient and cost-effective manner. In general, the communications method sends a status request message to a wireless carrier system that asks for certain pieces of status information pertaining to a particular telematics-equipped vehicle. After the wireless carrier system gathers the requested information, it sends back a status response message. If the status response message indicates that the telematics-equipped vehicle is able to receive certain data-related services, then an appropriately configured mobile-terminated data connection is established with the vehicle and those services are provided. If the telematics-equipped vehicle is unable to receive the data-related services, then the communications method attempts to identify and resolve any failure mode or other problem that is preventing the deployment of the data-related services. In cases where the source of the problem involves the telematics-equipped vehicle not being registered with a wireless network, the communications method can send a monitor request message to the wireless carrier system. A monitor request message generally instructs the system to be on the lookout for the particular telematics-equipped vehicle in question and to report back if and when it becomes registered.

Communications System—

Figure 1:
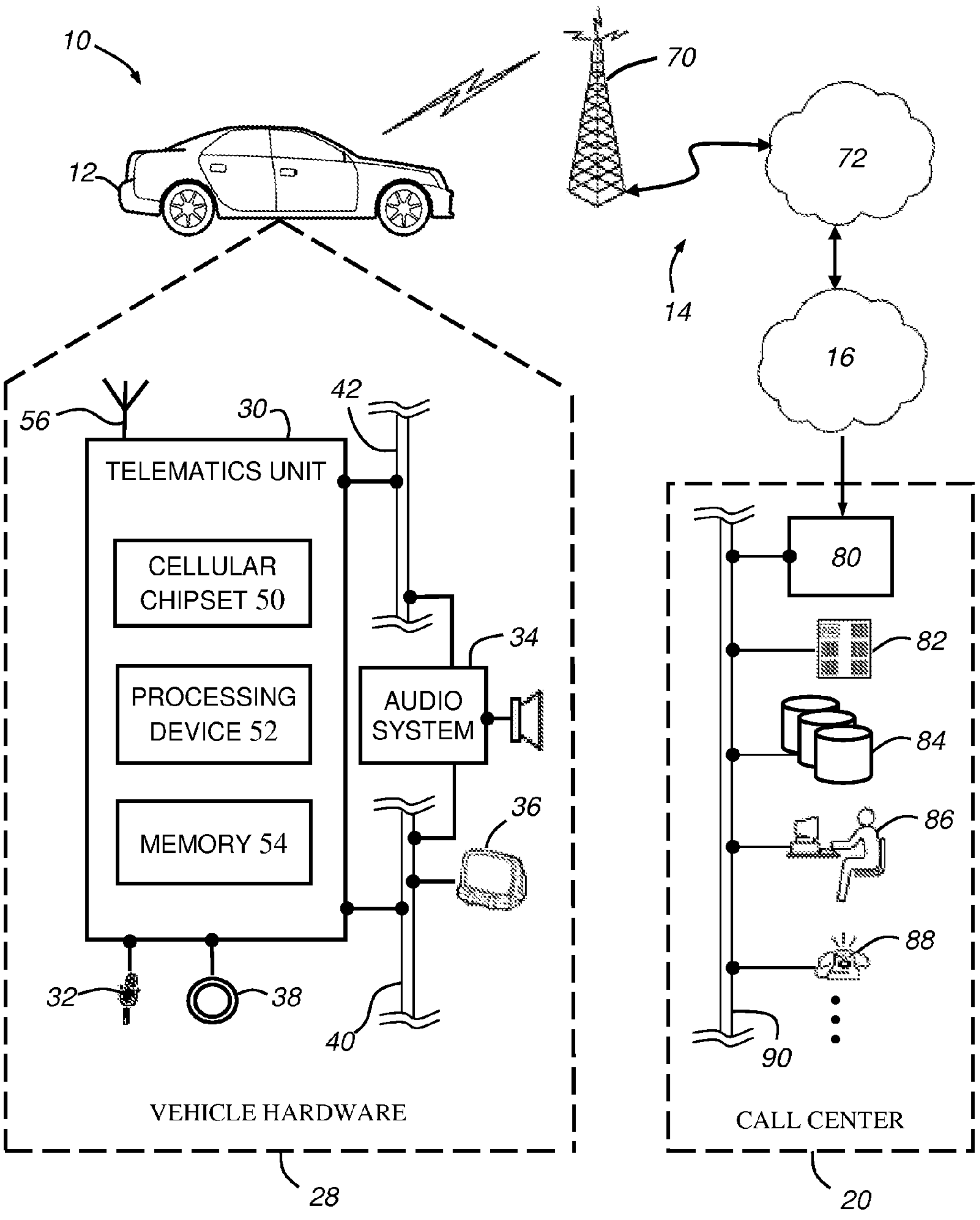
FIG. 1 is a block diagram depicting an exemplary embodiment of a communications system that is capable of utilizing the communications method disclosed herein.

Beginning with FIG. 1, there is shown an exemplary operating environment that can be used to implement the communications method disclosed herein. Communications system 10 generally includes a vehicle 12, a wireless carrier system 14, a communications network 16, and a call center 20. It should be understood that the communications method can be used with any number of different systems and is not specifically limited to the examples shown here. Also, the overall architecture, setup, and operation, as well as the individual components, of a system such as that shown here are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle hardware 28 is shown generally in FIG. 1 and includes a telematics unit 30, a microphone 32, an audio system 34, a visual display 36, and an electronic button or control 38 that are interconnected using one or more network connections, such as a communications bus 40 or an entertainment bus 42. Examples of suitable network connections include a controller area network (CAN), a media oriented system transfer (MOST), a local interconnection network (LIN), an ethernet, a local area network (LAN), and other appropriate connections such as those that conform with known ISO, SAE and IEEE standards and specifications, to name but a few.

Telematics unit 30 preferably enables wireless voice and/or data communication over wireless carrier system 14 so that the vehicle can communicate with call center 20, other telematics-enabled vehicles, or some other entity. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, software updates, etc. According to one embodiment, telematics unit 30 includes a standard cellular chipset 50 for voice communications like hands-free calling, a modem (not shown) for data transmission, an electronic processing device 52, one or more electronic memory devices 54, and a dual antenna 56. It should be appreciated that the modem can either be implemented through software that is stored in the telematics unit and is processed by an electronic processing device, or it can be a separate hardware component located internal or external to telematics unit 30. The modem can operate using any number of different standards or protocols such as EVDO, CDMA 1XRTT, GPRS, EDGE, WiMAX and HSDPA, to name but a few.

Electronic processing device 52 can be any type of suitable processing device capable of processing electronic instructions including, but certainly not limited to, microprocessors, microcontrollers, host processors, controllers, vehicle communication processors, and application specific integrated circuits (ASICs). Alternatively, the electronic processing device can work in conjunction with some type of central processing unit (CPU) or other component performing the function of a general purpose processor. Electronic processing device 52 executes various types of electronic instructions, such as software or firmware programs stored in electronic memory 54, which enable the telematics unit to provide a wide variety of services. For instance, electronic processing device 52 can execute programs or process data that enables the communications method discussed herein.

Telematics unit 30 provides too many services to list them all, but several examples include: turn-by-turn directions and other navigation-related services that are provided in conjunction with a GPS-based vehicle navigation module (not shown); airbag deployment notification and other emergency or roadside assistance-related services that are provided in connection with one or more collision sensor interface modules such as a body control module (not shown); infotainment-related services where music, webpages, movies, television programs, videogames and/or other information is downloaded by an infotainment module (not shown) and is stored for current or later playback; and software updates where software, patches, service packs, etc. can be automatically or manually deployed and implemented so that the vehicle's software can be kept up-to-date. The above-listed services are by no means an exhaustive list of all of the capabilities of telematics unit 30, but are simply an illustration of some of the services that the telematics unit is capable of offering.

Vehicle hardware 28 also includes a number of vehicle user interfaces that provide vehicle occupants with a means of providing and/or receiving information, including microphone 32, audio system 34, visual display 36, and button 38. These devices allow a vehicle user to input commands, receive audio/visual feedback, and provide voice communications, to name but some of the possibilities. Microphone 32 provides an occupant with a means for inputting verbal or other auditory information, and can be connected to an automated voice processing unit utilizing human-machine interface (HMI) technology known in the art. Conversely, audio system 34 provides verbal output to a vehicle occupant and can be a dedicated, stand-alone system or part of the primary vehicle audio system. According to the particular embodiment shown here, audio system 34 is operatively coupled to both vehicle bus 40 and entertainment bus 42 and can provide AM, FM and satellite radio, CD, DVD and other multimedia functionality. This functionality can be provided in conjunction with or independent of the infotainment module described above. Visual display 36 is preferably a graphics display, such as a touch screen on the instrument panel or a heads-up display reflected off of the windshield, and can be used to provide a multitude of input and output functions. Button 38 is an electronic pushbutton or other control that is typically used to initiate communication with call center 20 or some other service. Of course, numerous other vehicle user interfaces can also be utilized, as the aforementioned interfaces are only examples of some of the possibilities.

Wireless carrier system 14 is preferably a cellular telephone system but could be any other suitable wireless system, such as a satellite-based system, that is capable of transmitting signals between vehicle hardware 28 and call center 20. According to an exemplary embodiment, wireless carrier system 14 includes one or more wireless networks each having cell towers 70, base stations and/or mobile switching centers (MSCs) 72, as well as any other networking components required to connect wireless carrier system 14 with land network 16. As is appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. The wireless networks that make up wireless carrier system 14 could be operated by either a single wireless carrier or multiple wireless carriers.

Wireless carrier system 14 may utilize various networking devices or components like routers, servers, switches, etc. to facilitate data communications and/or provide additional data-related services and features. For example, wireless carrier system 14 may utilize any number of networking components to provide one or more of the following services: registration, authentication, dynamic host configuration protocol (DHCP), network address assignment, domain name system (DNS), dynamic DNS (DDNS), mobile number to network address resolution, SMS paging, and other network services. It will be appreciated by those skilled in the art that such services may be performed by any number of devices or components located within wireless carrier system 14, land network 16, call center 20, or simply in communication with wireless carrier system 14.

In one embodiment, wireless carrier system 14 may use authentication services to verify that each telematics-equipped vehicle that requests a data channel connection is authorized to do so. Authorization may be accomplished in a number of ways including, for example, using a mobile number of the telematics-equipped vehicle to verify that the vehicle is authorized to use a data channel. Wireless carrier system 14 may then provide the telematics-equipped vehicle 12 with a dynamic network address using dynamic host configuration protocol (DHCP), or any other suitable method of allocating dynamic network addresses to telematics-equipped vehicles.

Land network 16 may be a conventional land-based telecommunications network that is connected to one or more landline telephones and connects wireless carrier system 14 to call center 20. For example, land network 16 may include a public switched telephone network (PSTN) and/or a TCP/IP network, as is appreciated by those skilled in the art. Of course, one or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Call center 20 is designed to provide the vehicle hardware 28 with a number of different system back-end functions and, according to the exemplary embodiment shown here, generally includes one or more switches 80, servers 82, databases 84, live advisors 86, as well as a variety of other telecommunication and computer equipment 88 that is known in the art. These various call center components are preferably coupled to one another via a wired or wireless local area network 90. Switch 80, which can be a private branch exchange (PBX) switch, routes incoming signals so that voice transmissions are usually sent to either the live adviser 86 or an automated response system, and data transmissions are passed on to a modem or other piece of equipment 88 for demodulation and further signal processing. The modem preferably includes an encoder and can be connected to various devices such as a server 82 and database 84. Database 84 could be designed to store account information such as subscriber authentication information, vehicle identifiers, status information, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20, it will be appreciated that the call center can utilize an unmanned automated call response system and, in general, can be any central or remote facility, manned or unmanned, mobile or fixed, to or from which it is desirable to exchange voice and data transmissions.

Communications Method—

There are a number of scenarios where knowing the operational status of a telematics-equipped vehicle can be beneficial to making a mobile-terminated data connection. Knowing the operational status can improve, among other things, the efficiency of providing certain data-related services like adding calling minutes or updating vehicle software by avoiding unnecessary and mismatched communications. For example, if a particular telematics-equipped vehicle is not registered with a wireless network, it is unnecessary to send that vehicle data messages because it cannot receive them. Redundant communications such as these can increase air-time costs, burden communication resources, and reduce the overall efficiency of the communications system. Similarly, if a telematics-equipped vehicle is registered but is unable to receive certain types of data-related services, such as SMS messages, it is uneconomical to deploy those services to that vehicle. In the past, mass dialings would sometimes be used to try and contact the vehicle even though a large percentage of them were not going through. These situations and others can be avoided by using the communications method disclosed herein, which acquires status information on the telematics-equipped vehicle before contacting it.

Figure 2:
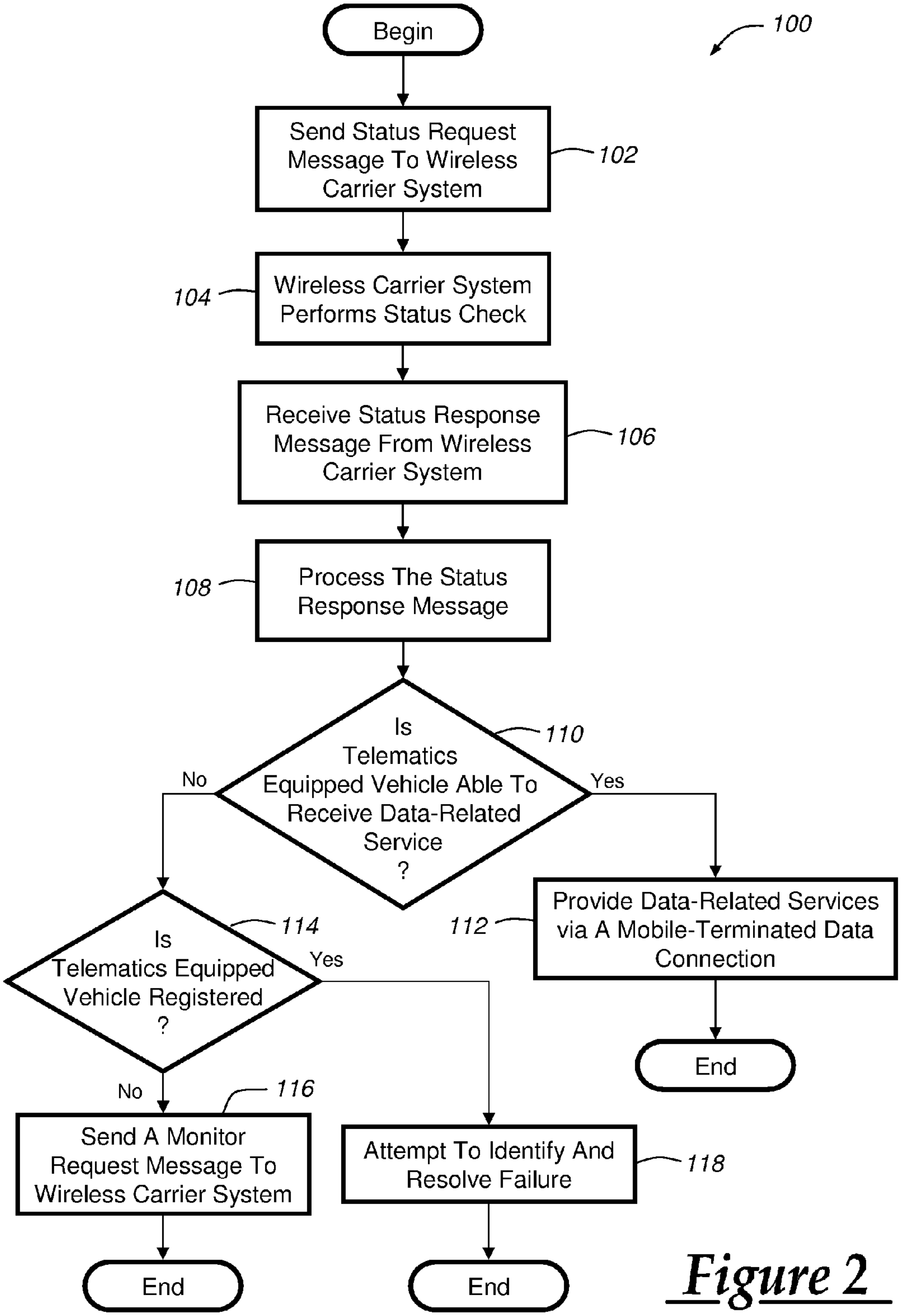
FIG. 2 is a flow chart depicting some of the steps of an embodiment of the communications method.

Turning now to the flowchart shown in FIG. 2, there is seen some of the steps of an embodiment of communications method 100. In step 102, call center 20 or some other contacting entity sends a status request message to wireless carrier system 14 that includes at least one vehicle identifier and at least one status information type. The status request message could be sent according to one of a number of different techniques, including ones that involve batch messages, individual messages, automated delivery, manual delivery, and more. For instance, a server, sub-system or other resource within call center 20 could be programmed to automatically send out a batch of status request messages to wireless carrier system 14 every so often. Each of the status request messages could pertain to a different telematics-equipped vehicle, or a single status request message could pertain to multiple vehicles. Alternatively, a vehicle user could request a data-related service by using a website, an onboard user interface or a telephone which would then cause call center 20 to send an individual status request message to wireless carrier system 14 regarding an individual telematics-equipped vehicle. In that example, the status request message could be generated on a real-time and individual basis and in response to a specific event (vehicle user's inquiry), as opposed to being automatically generated in a batch every so often.

Of course, other methods also exist for generating and sending a status request message and could be used by the present communications method. For example, when a new telematics-equipped vehicle is sold or leased or a new account is activated, there could be a mechanism or procedure in place that causes call center 20 to automatically send a corresponding status request message to wireless carrier system 14. It should be appreciated that the status request message could be sent by a contacting entity other than call center 20, like another telematics unit, an engineering or other facility, a cellular phone, a PDA, a personal or laptop computer, an IP push server, a router, a messaging device, or any internet connected device. The foregoing are only some examples of how to trigger, initiate and send a status request message, as many others also exist.

The status request message can be constructed according to any suitable data format, protocol, arrangement, etc., so long as it is mutually agreed upon by both the contacting entity (call center 20 in the example above) and the wireless carrier system. The status request message includes at least one vehicle identifier and at least one status information type; although it could additional information as well. As its name suggests, the vehicle identifier identifies the particular vehicle for which the call center is seeking status information. Without this piece of information the wireless carrier system would not know which wireless communications device to pull status information on. A variety of potential vehicle identifiers could be used including, but certainly not limited to: electronic serial numbers (ESNs), mobile equipment identifiers (MEIDs), media access control addresses (MAC addresses), mobile identification numbers (MINs), mobile directory numbers (MDNs), Internet protocol addresses (IP addresses), vehicle identification numbers (VINs), subscriber account numbers and/or names, etc. It is preferable to use a vehicle identifier that uniquely identifies the telematics-equipped vehicle and is permanently associated with the wireless communications device on board; for instance ESNs, MEIDs and MAC addresses. The term 'vehicle identifier' broadly includes any type of information that can be used by the wireless carrier system to uniquely identify a particular telematics-equipped vehicle.

The status information type generally identifies the type or category of status information that is being sought from wireless carrier system 14. Some examples of suitable status information types include, but are not limited to: registration status, authentication status, network identification status, device identification status, and the device mode status. When a wireless communications device is turned on or enters a new wireless network, it typically registers with that network. Thus, the 'registration status' generally indicates whether a wireless communications device is registered with a wireless network and/or it identifies the wireless network that it is registered with. The 'authentication status' generally indicates whether the wireless communications device is authenticated by the wireless network in which it is registered. As is appreciated by those skilled in the art, there are a variety of factors that could affect a device's authentication status. For instance, if a customer does not pay their bills, if there is a key mismatch between the wireless communications device and the wireless network, and if the device roams into a new, incompatible wireless network are all examples of events that could potentially impact the authentication status of the wireless communications device.

It can also be helpful to know the 'network identification status', which generally includes information regarding the characteristics and/or capabilities of the cooperating wireless network. The network identification status could expressly indicate the attributes of the wireless network in question or it could simply identify the network so that call center 20 could then look up its capabilities with some type of automatic or manual inquiry. Wireless networks will oftentimes maintain a list of all of the known identifiers for each wireless communications device operating within its boundaries; this information is hereafter referred to as the 'device identification status'. For example, the wireless network could store a combination of the ESN, MEID, MDN, MIN, MAC address and/or IP address for each registered and/or authenticated wireless device in its jurisdiction. Communications method 100 may want to verify or corroborate its vehicle identifier records with that of the wireless network, in which case it would be interested in the device identification status. The device identification status can also include information regarding the status of any temporary identifiers; that is, indicate whether or not a non-permanent identifier, like an IP address, is still valid. The 'device mode status' generally indicates the network connection mode of the wireless communications device and/or the wireless network. Examples of different device mode statuses include digital, analog, CDMA versions, GSM versions, etc. It should again be emphasized that the preceding examples of different status information types are only some of the possibilities, as others types of desirable status information will be apparent to those skilled in the art and could be used with the communications method described herein.

In step 104, wireless carrier system 14 receives the status request message from the preceding step, processes its contents, and performs any status checks that it is capable of and authorized to perform. It should be appreciated that the status request message could be sent to and processed by one of any number of different devices, components, sub-systems, servers, etc. of wireless carrier system 14, depending on how the system is designed. Furthermore, the entity within wireless carrier system 14 that receives the status request message does not necessarily have to be the same entity that performs the status check, although it could be. According to one embodiment, the status request message is received by wireless carrier system 14 at some type of data center and, depending on the current location of the telematics-enabled vehicle in question, is then forwarded on to the appropriate base station and/or mobile switching center (MSC) 72 (hereafter referred to simply as 'mobile station'). Once the status request message is at mobile station 72, a status inquiry is performed for the vehicle associated with the vehicle identifier by acquiring data that corresponds to the status information types contained within the message.

As previously indicated, it is possible to include multiple vehicle identifiers within a single status request message so that status information is gathered on multiple vehicles. One way to implement such a feature is for the data center to receive the status request message, extract the various vehicle identifiers, generally determine which cells, networks, etc. the corresponding vehicles are located in, and send separate status request messages to each mobile station 72 whose network includes one or more of the vehicles in question. A single message or multiple messages could be sent to a mobile station 72 whose network includes more than one vehicle being sought.

In step 106, wireless carrier system 14 sends a status response message to call center 20 that includes status information corresponding to the provided vehicle identifier and status information type, assuming that such information was found. The status response message is at least partially based on the results of the search, step 104. For example, if the status request message in step 102 included a single ESN and three status information types (registration status, authentication status, network identification status), then an appropriate status response message could include data indicating that the telematics-equipped vehicle is registered in network A (registration status), was last authorized by network A on January $1^{st}$ (authentication status), and that network A is a digital 3-G network with certain broadband wireless data capabilities (network identification status). Again, the status response message may include information in addition to that requested, such as the time of the last data channel connection, the date and/or time of the expiration of a dynamic network address, an error message, etc.

Next, the status response message is received from wireless carrier system 14 and the status information contained therein is utilized to determine whether or not telematics-equipped vehicle 12 is able to receive certain data-related services, step 108. The processing of the status response message could be performed by a server, sub-system or some other computing resource within call center 20 or it could be manually reviewed by a live advisor 86, for example. The particular computing resource within call center 20 that actually processes the status response message could be dictated by the ultimate data-related service that the call center is attempting to provide. For instance, if call center 20 wishes to send an SMS message to telematics-equipped vehicle 12 (the impetus for executing communications method 100), then the status response message could be forwarded to an SMS server for processing. Likewise, if call center 20 initiated communications method 100 because it wishes to send a software update package to telematics-equipped vehicle 12, then the status response message could be sent to an IP server for processing. These are only some examples of possible approaches for processing the status response message, as other approaches will become apparent to those skilled in the art and are intended to be included herein.

If the telematics-equipped vehicle in question appears able to receive the data-related services in question, decision step 110, then call center 20 provides those services to the vehicle via a mobile-terminated data connection, step 112. The precise criteria used in step 110 can be permanently established or can altered by an authorized person at the call center or elsewhere. According to one embodiment, step 110 first determines whether or not telematics unit 30 is registered with a particular wireless network; this is reflected in the registration status discussed above. As already mentioned, the registration status can also indicate which wireless network the telematics unit is registered with, as well as provide additional related information. Next, step 110 determines if the other status information indicates the presence of any failures. For example, failures could be found if the authentication status indicates that the telematics unit 30 has not been authenticated by the wireless network to which it is registered, or if the device identification status indicates that the wireless network's records have a different IP address for the telematics unit than the call center's records. These are, of course, only some examples of potential failures, as others could surely be used as well. Assuming that the telematics-equipped vehicle is both registered and is not experiencing any failures, call center 20 attempts to establish a mobile-terminated data connection with telematics-equipped vehicle 12, step 112.

The mobile-terminated data connection can be established and the data-related services can be provided to the vehicle according to methods known in the art, such as through packet data connections. Suitable methods include the method taught in U.S. application Ser. No. 11/554,000, which is incorporated herein by reference and is assigned to present assignee. As already indicated, a variety of data-related services can be provided, including: software-related services (sending files, patches, service packs, etc.), message-related services (sending SMS messages, emails, etc.), configuration-related services (making changes to the account by adding or removing telematics features, enabling or disabling the telematics unit, adding calling minutes, etc.), and diagnostic-related services (sending diagnostic data requests, changing the diagnostic data that is monitored, modifying the settings on one or more vehicle electronic modules, etc.). Again, these are only examples of some of the potential data-related services available, as that term broadly includes all services that can be provided to a telematics-equipped vehicle via a mobile-terminated data connection.

Returning to decision step 110, if telematics-equipped vehicle 12 is not registered or is experiencing some type of failure or difficulty, then the communications method generally attempts to determine the cause or nature of the problem. In step 114, the communications method determines if telematics-equipped vehicle 12 is registered. If the telematics-equipped vehicle is registered, then communications method goes through a sequence of inquiries to try and pinpoint the problem, step 116. For example, step 116 could check the authentication status to determine if the unit is properly authenticated. If it is not authenticated, then a message could be sent to call center 20, the user and/or the wireless network in order to attempt to work out the problem. If there is a mismatch or some type of incapability between the capabilities of the telematics-equipped vehicle and those of the wireless network, then the communications method could try and identify alternative data-related services that could be provided instead. If telematics unit 30 lacks a valid IP address so that sending packet data information is not possible, then the communications method could try and obtain a proper IP address through a variety of techniques, including those disclosed in U.S. application Ser. No. 11/554,000, as mentioned above. These are only some examples of how to identify and resolve the failure mode, as numerous others could also be used.

If the telematics-equipped vehicle is not registered, then step 118 can send a monitor request message to the wireless carrier system 14 so that the system monitors its wireless networks waiting for the particular telematics-equipped vehicle to become registered. This step of sending a monitor request message to wireless carrier system 12 can be performed in a variety of ways. According to one such way, call center 20 sends a monitor request message that includes one or more vehicle identifiers (so the wireless carrier system knows which telematics-equipped vehicle to look for) and some instructions for how the wireless carrier system can contact the call center if and when the vehicle is registered. More detailed instructions could also be provided to wireless carrier system 12, such as providing the wireless carrier system with retry timer settings and time-to-live (TTL) information. Once this monitor request message is sent to wireless carrier system 12, the communications method can simply wait for a response or the expiration of some timer.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

For instance, the communications method just described could be executed in response to one of a number of different scenarios. Communications method 100 could be automatically executed before each attempted mobile-terminated data connection; that way, the call center will know beforehand if such a connection is possible. Alternatively, communications method 100 could be executed once a mobile-terminated data connection has been attempted and has failed, that way method 100 is not performed for each mobile-terminated data connection but only those that are experiencing a problem.

It should also be appreciated that the status response message can be sent directly to the entity or device trying to establish the mobile-terminated data connection with telematics-equipped vehicle 12, or it can be sent to an intermediary device such as a router, a different call center 20, an IP Push server, a messaging system, a cellular phone, a PDA, another telematics-equipped vehicle 12, or any other networking device or component. The intermediary device can store the status information and update the call center periodically, or it can simply pass the information along to the appropriate computing resource within the call center.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of providing data-related services to a telematics-equipped vehicle, the method comprising the steps of:
   (a) sending a status request message to a wireless carrier system, the status request message includes a vehicle identifier and a status information type;
   (b) receiving a status response message from the wireless carrier system, the status response message includes status information corresponding to the vehicle identifier and the status information type;
   (c) utilizing the status information to determine if the telematics-equipped vehicle is able to receive the data-related services; and
   (d) if the telematics-equipped vehicle is able to receive the data-related services, then providing the data-related services to the telematics-equipped vehicle by establishing a mobile-terminated data connection with the telematics-equipped vehicle.

2. The method of claim 1, wherein step (a) further comprises sending the status request message to the wireless carrier system by sending an individual status request message that pertains to a single telematics-equipped vehicle.

3. The method of claim 1, wherein step (a) further comprises sending the status request message to the wireless carrier system by sending a batch of status request messages that pertain to a plurality of telematics-equipped vehicles.

4. The method of claim 1, wherein step (a) further comprises sending the status request message to the wireless carrier system by sending a single status request message that includes a plurality of vehicle identifiers, and wherein steps (b)-(d) are carried out for each of the plurality of vehicle identifiers and their associated vehicles.

5. The method of claim 1, wherein step (a) is performed in response to a user making a request through a resource selected from the group consisting of: an affiliated website, an onboard user interface, or a telephone.

6. The method of claim 1, wherein step (a) is performed in response to the telematics-equipped vehicle experiencing a change in ownership or account status.

7. The method of claim 1, wherein the vehicle identifier is selected from the group consisting of: an electronic serial number (ESN), a mobile equipment identifier (MEID), a media access control address (MAC address), a mobile identification number (MIN), a mobile directory number (MDN), an Internet protocol address (IP address), a vehicle identification number (VIN), a subscriber account number and/or name.

8. The method of claim 1, wherein the status information type is selected from the group consisting of: registration status, authentication status, network identification status, device identification status, and device mode status.

9. The method of claim 1, wherein the data-related service is selected from the group consisting of: software-related services, message-related services, configuration-related services, and diagnostic-related services.

10. The method of claim 1, wherein step (c) further comprises utilizing the status information by determining if the telematics-equipped vehicle is registered with a wireless network, and if the telematics-equipped vehicle is not registered then sending a monitor request message to the wireless carrier system.

11. The method of claim 1, wherein step (c) further comprises utilizing the status information by determining if there are any failures between the telematics-equipped vehicle and a wireless network, and if there are failures therebetween then reviewing the status information contained within the status response message to determine the cause of failure.

12. A method of providing data-related services to a telematics-equipped vehicle, the method comprising the steps of:
   (a) sending a status request message from a call center to a wireless carrier system, the status request message includes a vehicle identifier;
   (b) receiving a status response message from the wireless carrier system at the call center, the status response message includes status information corresponding to the vehicle identifier; and
   (c) utilizing the status information to determine if the telematics-equipped vehicle is registered with a wireless network so that:
      (i) if the telematics-equipped vehicle is registered with a wireless network and is able to receive the data-related services, then providing the data-related services to the telematics-equipped vehicle;
      (ii) if the telematics-equipped vehicle is registered with a wireless network but is unable to receive the data-related services, then reviewing the status information to determine the cause of the problem; and
      (iii) if the telematics-equipped vehicle is not registered with a wireless network, then sending a monitor request message from the call center to the wireless carrier network.

13. The method of claim 12, wherein step (c)(i) further comprises providing the data-related services to the telematics-equipped vehicle by establishing a mobile-terminated data connection from the call center to the telematics-equipped vehicle.

14. The method of claim 12, wherein step (a) further comprises sending the status request message to the wireless carrier system by sending an individual status request message that pertains to a single telematics-equipped vehicle.

15. The method of claim 12, wherein step (a) further comprises sending the status request message to the wireless carrier system by sending a batch of status request messages that pertain to a plurality of telematics-equipped vehicles.

16. The method of claim 12, wherein step (a) further comprises sending the status request message to the wireless carrier system by sending a single status request message that includes a plurality of vehicle identifiers, and wherein steps (b) and (c)(i)-(c)(iii) are carried out for each of the plurality of vehicle identifiers and their associated vehicles.

17. The method of claim 12, wherein the vehicle identifier is selected from the group consisting of: an electronic serial number (ESN), a mobile equipment identifier (MEID), a media access control address (MAC address), a mobile identification number (MIN), a mobile directory number (MDN), an Internet protocol address (IP address), a vehicle identification number (VIN), a subscriber account number and/or name.

18. The method of claim 12, wherein the status request message further includes at least one status information type selected from the group consisting of: registration status, authentication status, network identification status, device identification status, and device mode status.

19. The method of claim 12, wherein the data-related service is selected from the group consisting of: software-related services, message-related services, configuration-related services, and diagnostic-related services.

* * * * *